United States Patent
Zhang et al.

(10) Patent No.: US 11,203,714 B2
(45) Date of Patent: Dec. 21, 2021

(54) LUMINESCENT MATERIAL AND PREPARATION METHOD THEREOF

(71) Applicant: QINGDAO UNIVERSITY, Qingdao (CN)

(72) Inventors: Juncheng Zhang, Qingdao (CN); Cong Pan, Qingdao (CN); Yifei Zhu, Qingdao (CN)

(73) Assignee: QINGDAO UNIVERSITY, Qingdao (CN)

( * ) Notice: Subject to any disclaimer, the term of this patent is extended or adjusted under 35 U.S.C. 154(b) by 226 days.

(21) Appl. No.: 16/513,549

(22) Filed: Jul. 16, 2019

(65) Prior Publication Data

US 2020/0024513 A1 Jan. 23, 2020

(30) Foreign Application Priority Data

Jul. 19, 2018 (CN) .......................... 201810817414.1

(51) Int. Cl.
  *C09K 11/77* (2006.01)
(52) U.S. Cl.
  CPC ................................ *C09K 11/7766* (2013.01)
(58) Field of Classification Search
  CPC .................... C09K 11/7766; C09K 11/7769
  See application file for complete search history.

(56) References Cited

U.S. PATENT DOCUMENTS

2013/0214523 A1* 8/2013 Kecht ................ C09K 11/7756
283/67

FOREIGN PATENT DOCUMENTS

| CN | 102602957 A | 7/2012 |
|---|---|---|
| CN | 105349142 A | 2/2016 |
| CN | 105400511 A | 3/2016 |
| CN | 105462586 A | 4/2016 |
| CN | 105542765 A | 5/2016 |
| CN | 105694884 A | 6/2016 |
| CN | 105778908 A | 7/2016 |
| CN | 105885833 A | 8/2016 |
| CN | 107474834 A | 12/2017 |
| CN | 107488448 A | 12/2017 |

(Continued)

OTHER PUBLICATIONS

Wu. Photoluminescence Properties of Er/Pr-Doped K0.5Na0.5NbO3 Ferroelectric Ceramics. J. Am. Ceram. Soc., 98 [7] 2139-2145 (2015) (Year: 2015).*

(Continued)

*Primary Examiner* — Matthew E. Hoban
(74) *Attorney, Agent, or Firm* — J.C. Patents

(57) ABSTRACT

The present application relates to a luminescent material and a preparation method thereof. The luminescent material having a chemical formula of $M_{1-x-y-z}NbO_3:xPr,yEr$, where M is alkali metal element, $0.001 \leq x \leq 0.05$, $0.001 \leq y \leq 0.1$, and $-0.05 \leq z \leq 0.05$. The luminescent material is a dual-lifetime (fluorescence and long-lasting luminescence) and colorful (red, orange, yellow, yellow green and green) renewable luminescent material that respond to multiple stimulation (heat, force and light), and has a characteristic of multidimensional identifiability such as excitation mode, luminescence lifetime and luminescence color.

7 Claims, 7 Drawing Sheets

(56) References Cited

FOREIGN PATENT DOCUMENTS

CN 108793184 A 11/2018

OTHER PUBLICATIONS

Wang. Yb Sensitized Near-Stoichiometric Er:LiNbO3 Single Crystal: A Matrix for Optical Communication and Upconversion Emission. Crystal Growth & Design 2018 18 (3), 1495-1500 (Year: 2018).*

Zhang, Jun-Cheng et al., "Enhancement of luminescence and afterglow in CaTiO3:Pr3+ by Zr substitution for Ti" Journal of Alloys and Compounds; vol. 498; (May 2010); pp. 152-156.

Zhang, Jun-Cheng et al., "Studies on AC Electroluminescence Device Made of BaTiO3-CaTiO3:Pr3+ Diphase Ceramics" Applied Physics Express; vol. 3; (2010); pp. 022601-1-022601-3.

Zhang, Jun-Cheng et al., "Strong Elastico-Mechanoluminescence in Diphase (Ba,Ca) TiO3:Pr3+ with Self-Assembled Sandwich Architecture" Journal of The Electrochemical Society; vol. 157, Issue 12; (2010); pp. G269-G273.

Zhang, Jun-Cheng et al., "Dielectric and Luminescent Properties of the A- and B-Site Doped CaTiO3:Pr3+ Ceramics" Journal of Ferroelectrics; vol. 401; (2010); pp. 226-232.

Zhang, Jun-Cheng et al., "Elastico-mechanoluminescence properties of Pr3+-doped BaTiO3-CaTiO3 diphase ceramics with water resistance behavior" Journal of Science Direct; Ceramics International; vol. 38S; (2012); pp. S581-S584.

Zhang, Jun-Cheng et al., "An intense elastico-mechanoluminescence material CaZnOS: Mn2+ for sensing and imaging multiple mechanical stresses" Journal of Optics Express; vol. 21, No. 11; (2013); pp. 12976-12986.

Zhang, Jun-Cheng et al., "Elastico-mechanoluminescence in CaZr(PO4)2:Eu2+ with multiple trap levels" Journal of Optics Express; vol. 21, No. 11; (2013); pp. 13699-13709.

Zhang, Jun-Cheng et al., "Eu2+/Eu3+-emission-ratio-tunable CaZr(PO4)2:Eu phosphors synthesized in air atmosphere for potential white light-emitting deep UV LEDs" Journal of Materials Chemistry C; vol. 2; (2014); pp. 312-318.

Zhang, Jun-Cheng et al., "Novel elastico-mechanoluminescence materials CaZnOS:Mn2+ and CaZr(PO4)2:Eu2+" Journal of Advanced Dielectrics; vol. 4, No. 3; (2014); pp. 1430003-1-1430003-7.

Zhang, Jun-Cheng et al., "Controlling elastico-mechanoluminescence in diphase (Ba,Ca)TiO3:Pr3+ by co-doping different rare earth ions" Journal RSC Advances; vol. 4; (2014); pp. 40665-40675.

Zhang, Jun-Cheng et al., "Elastico-mechanoluminescent enhancement with Gd3+ codoping in diphase (Ba,Ca)TiO3:Pr3+" Journal of Optical Materials Express; vol. 4, No. 11; (2014); pp. 2300-2309.

Zhang, Jun-Cheng et al., "Color Manipulation of Intense Multiluminescence from CaZnOS:Mn2+ by Mn2+ Concentration Effect" Journal of Chemistry of Materials; vol. 27; (2015); pp. 7481-7489.

Zhang, Jun-Cheng et al., "Creating Recoverable Mechanoluminescence in Piezoelectric Calcium Niobates through Pr3+ Doping" Journal of Chemistry of Materials; vol. 28; (2016); pp. 4052-4057.

Zhang, Jun-Cheng et al., "Multicolor Tuning in Room-Temperature Self-Activated Ca2Nb2O7 Submicroplates by Lanthanide Doping" Article in Chemphyschem Communications; vol. 18; (2017); pp. 269-273.

Gao, Nan et al., "AC Electroluminescent Processes in Pr3+-Activated (Ba0.4Ca0.6)TiO3 Diphase Polycrystals" Article in Materials; vol. 10; (2017); 7 pages.

Pan, Cong et al., "Intrinsic oxygen vacancies mediated multi-mechano-responsive piezoluminescence in undoped zinc calcium oxysulfide" Journal of Applied Physics Letters; vol. 110; (2017); pp. 233904-1-22304-5.

Fan, Xin-Hua et al., "Piezoluminescence from ferroelectric Ca3Ti2O7:Pr3+ long-persistent phosphor" Journal of Optics Express; vol. 25, No. 13; (Jun. 2017); pp. 14238-14246.

Zhang, Jun-Cheng et al., "Sacrificing trap density to achieve short-delay and high-contrast mechanoluminescence for stress imaging" Journal of Acta Materialia; vol. 152; (2018); pp. 148-154.

Pan, Cong et al., "Trap-controlled mechanoluminescence in Pr3+-activated M2Nb2O7 (M=Sr, Ca) isomorphic perovskites" Journal of Optical Materials Express; vol. 8, No. 6; (Jun. 2018); pp. 1425-1434.

First Office Action of the priority CN application 2018108174141.

"Photoluminescece Properties of ErPr-Doped K0.5Na0.5NbO3 Ferroelectric Ceramics", J. Am. Ceram. Soc., 98[7] 2139-2145 (2015).

* cited by examiner

LUMINESCENT MATERIAL AND PREPARATION METHOD THEREOF

CROSS-REFERENCE TO RELATED APPLICATION

The present application claims priority to Chinese Patent Application No. 201810817414.1 filed on Jul. 19, 2018, the disclosure of which is hereby incorporated herein by reference in its entirety.

TECHNICAL FIELD

The present application belongs to the technical field of materials physics, and relates to a luminescent material and a preparation method thereof.

BACKGROUND OF THE INVENTION

In the era of continuous development and advancement of science and technology, more and more device products tend to be intelligent and multifunctional. Multifunctional materials are always a hot topic concerned, explored and studied by professionals. Luminescent materials play important roles in the multifunctional materials.

As a kind of important functional materials, luminescent materials are widely applied in various high-tech fields such as information, aerospace, detection and biology. In order to adapt to the rapid development of today's technological industries and meet the requirements for the multi-functionalization of luminescent materials, scholars in China and at abroad deeply study and continuously improve the original performances of the luminescent materials, and also actively explore and expand their new functions, so that the functionality of the luminescent materials is converted from single to multiple. The excitation mode, luminescence lifetime and luminescence color are three important properties of the luminescent materials. The following description is given by taking three common luminescence modes, i.e., photoluminescence, upconversion luminescence and long-lasting luminescence, as examples. The photoluminescence, also known as downconversion luminescence, is to convert excitation light with a short wavelength into emission light with a long wavelength, for example, visible light emission under ultraviolet light excitation. The upconversion luminescence is to convert excitation light with a long wavelength into emission light with a short wavelength, for example, visible light emission under near-infrared light excitation. Both the photoluminescence and the upconversion luminescence have a fluorescence characteristic, i.e., short luminescence lifetime (usually less than 1 second), and disappears immediately once excitation is stopped. In contrast, the long-lasting luminescence is delayed emission, which will be lasting for a period of time after excitation is stopped, and thus the luminescence lifetime is relatively long (greater than or much greater than 1 second).

However, conventional luminescent materials often emit light with a single lifetime and a single color under a single excitation mode, resulting in low-dimensional identifiability of the luminescence phenomenon and limiting application fields of the luminescent materials. Therefore, researchers expect to integrate more functions into one luminescent material, so as to realize the multidimensional identifiability of luminescence and expand the application fields of the luminescent material. At present, luminescent materials having any combination of two of the three luminescence modes (photoluminescence+upconversion luminescence; photoluminescence+long-lasting luminescence; upconversion luminescence+long-lasting luminescence) have been mostly reported, but luminescent materials integrating the three luminescence modes are rarely reported. Additionally, the mechanoluminescence mode, i.e., a luminescence phenomenon caused by external mechanical stimulation (e.g., compression, friction or the like), is an emerging luminescence mode and can also increase identifiable dimensionalities of the luminescent materials. Although most of the existing mechanoluminescent materials also integrate the long-lasting luminescence mode, they exhibit only one luminescence color. If the four luminescence modes, i.e., photoluminescence, upconversion luminescence, long-lasting luminescence and mechanoluminescence, can be integrated into one luminescent material to exhibit dual-lifetime colorful luminescence for multiple responses, the application fields of the materials will certainly be expanded. Therefore, it is of important scientific and application significance. However, due to the complexity of interrelationships between the multiple luminescence modes, such highly-integrated luminescent materials have not been reported so far.

SUMMARY OF THE PRESENT INVENTION

An objective of the present application is to overcome the deficiency of less identifiable dimensionalities of luminescence of the existing luminescent materials and provide a dual-lifetime (fluorescence and long-lasting luminescence) and colorful (red, orange, yellow, yellow green and green) renewable luminescent material that respond to multiple stimulation (heat, force and light) and a preparation method thereof.

For this purpose, in one aspect, the present application provides a luminescent material having a chemical formula of $M_{1-x-y-z}NbO_3$:$xPr,yEr$, where M is one of or a combination of two or more of alkali metal elements Li, Na and K, and $0.001 \leq x \leq 0.05$, $0.001 \leq y \leq 0.1$ and $-0.05 \leq z \leq 0.05$.

Preferably, $0.003 \leq x \leq 0.03$, $0.003 \leq y \leq 0.08$, and $-0.05 \leq z \leq 0.03$.

Emission light of the luminescent material exhibits two kinds of lifetimes, i.e., fluorescence and long-lasting luminescence; the fluorescence disappears immediately once excitation is stopped, while the long-lasting luminescence will be lasting after the excitation is stopped.

The long-lasting luminescence of the luminescent material is capable of being repeatedly excited by irradiation of light having a wavelength of 300 nm to 500 nm.

The luminescent material has long-lasting luminescence characteristic at room temperature; long-lasting luminescence disappears by cooling, and reappears when the temperature rises again.

The luminescent material is capable of emitting mechanoluminescence under mechanical stimulation, and an intensity of the mechanoluminescence is directly proportional to an intensity of applied stress.

The emission light of the luminescent material is color-tunable luminescence among red, orange, yellow, yellow green and green; under temperature stimulation and mechanical stimulation, the luminescence is red and has a wavelength of 580 nm to 650 nm; under irradiation of near-infrared light having a wavelength of 980 nm, the luminescence is green and has a wavelength of 520 nm to 570 nm; under irradiation of ultraviolet light having a wavelength of 360 nm to 379 nm, the luminescence has a continuously tunable color in red-orange-yellow-yellow green-green according to selectivity of irradiation wavelength; and a tunable wavelength of the luminescence ranges from 520 nm to 650 nm.

In another aspect, the present application provides a preparation method for the abovementioned luminescent material, which uses a solid phase synthesis method and comprises the following steps:

a) separately weighing an alkali metal raw material, an Nb raw material, a Pr raw material and an Er raw material in a stoichiometric ratio of elements, adding deionized water or absolute ethyl alcohol, fully grinding and drying to obtain mixed powder;

b) pre-sintering the mixed powder in the air, and cooling to obtain a cooled product;

c) grinding and uniformly mixing the cooled product, and calcining the cooled product in the air to obtain a calcined product; and d) cooling the calcined product and grinding into powder to obtain the luminescent material.

Preferably, the alkaline metal raw material comprises one of or a combination of two or more of carbonates, oxides, sulfides, halides and peroxides of alkaline metal elements; the Nb raw material comprises one or two of oxides and chlorides of Nb; the Pr raw material comprises one of or a combination of two or more of oxides, nitrates and carbonates of Pr; and, the Er raw material comprises one of or a combination of two or more of oxides, nitrates and carbonates of Er.

Preferably, in the step b), a temperature for the pre-sintering is 700° C. to 950° C., and a time for the pre-sintering is 3 to 6 hours.

Preferably, in the step c), a temperature for the calcining is 950° C. to 1400° C., and a time for the calcining is 3 to 8 hours.

In still another aspect, the present application provides applications of the luminescent material in fields of luminescence, illumination, display, imaging, testing, anti-counterfeiting and information security.

Compared with the prior art, the present application has at least the following advantages and active effects.

(1) The luminescent material of the present application is a multifunctional luminescent material which integrates responses to multiple stimulation such as heat, force and light, and has a characteristic of multidimensional identifiability such as excitation mode, luminescence lifetime and luminescence color.

(2) The luminescent material of the present application can be reused since all the integrated luminescence performances are renewable. For example, the material can repeatedly emit fluorescence under ultraviolet or near-infrared stimulation. The material exhibits afterglow after subjected to effective light irradiation at a wavelength of 300 nm to 500 nm, and emits mechanoluminescence under the stimulation of external heat and/or force. The intensity of long-lasting luminescence will be gradually weakened over time, but effective light irradiation again will restore the luminescence intensity of the long-lasting luminescence. Therefore, the luminescent material has renewability.

(3) The luminescent material of the present application is prepared by a solid phase reaction method and has simple preparation process, easily-controlled conditions, low equipment requirements and low cost. Moreover, no toxic gas is generated during the preparation process, so no pollution is caused to the environment.

(4) For the luminescent material of the present application, the powdery material can be missed with various polymeric high-molecular materials (e.g., one of or a combination of two or more of dimethyl siloxane, transparent thermoplastic elastomer, transparent rubber, transparent plastics, polyurethane, polyester and nylon) to obtain a composite film or device, so that the characteristics of waterproofness, flexibility, elasticity, high tensile strength, wearability of the high-molecular material are integrated to realize applications in different fields.

(5) The luminescent material of the present application can be applied in fields of luminescence, illumination, display, imaging, testing, anti-counterfeiting and information security.

DETAILED DESCRIPTION OF THE INVENTION

Figure 1:
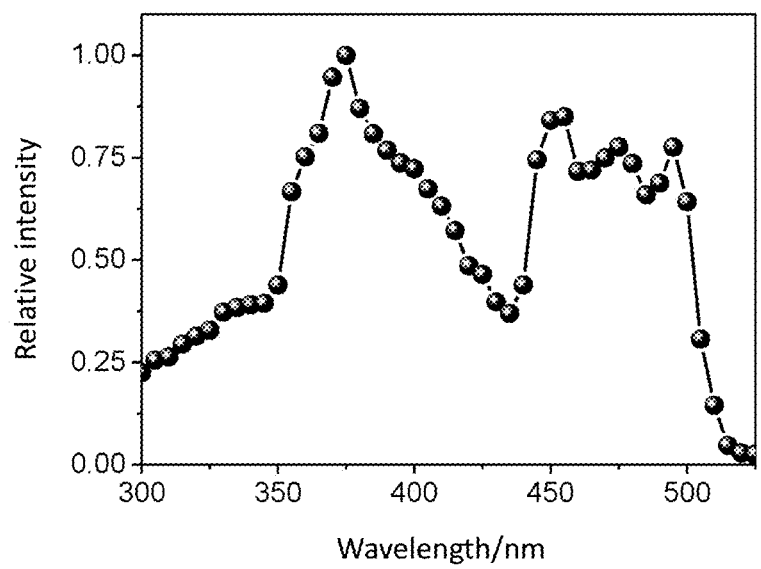
FIG. 1 is an excitation spectrum of long-lasting luminescence of a sample in Embodiment 1.

The present application will be described below in detail by particular embodiments with references to the accompanying drawings. It should be understood that the method steps mentioned in the present application do not exclude other method steps before and after the combination of steps, or other method steps can be inserted before the steps explicitly mentioned. It should also be understood that the embodiments are merely for describing the present application, rather than limiting the scope of the present application. Moreover, unless otherwise indicated, the serial numbers of the method steps are merely a convenient tool for identifying the method steps, and not intended to limit the order of the method steps or limit the implementable scope of the present application. Alterations or adjustments to the relative relationship between the method steps shall fall into the implementable scope of the present application without substantial alterations in the technical content.

An embodiment of the present application provides a luminescent material having a chemical formula of $M_{1-x-y-z}NbO_3$:xPr,yEr, where M is one of or a combination of two or more of alkali metal elements Li, Na and K, $0.001 \leq x \leq 0.05$, $0.001 \leq y \leq 0.1$, and $-0.05 \leq z \leq 0.05$.

The luminescent material can make luminescence response to multiple stimulation such as temperature, force and light, where the temperature refers to the stimulation of room temperature, cooling or heating. The force refers to any mechanical action, such as pulling, pressing, rubbing, etc. The light refers to ultraviolet light, visible light or near-infrared light. Moreover, the luminescent material can emit various lights of different colors and properties under different stimulation. That is to say, the luminescent material has multidimensional identifiability.

The multidimensional identifiable luminescent material provided by this embodiment of the present application is realized by doping lanthanides Pr and Er into the inorganic main material $M_{1-x-y-z}NbO_3$. On one hand, ions $Pr^{3+}$ and $Er^{3+}$ can emit lights of different colors and properties during energy level transition. The luminescent material, after subjected to light irradiation, will emit red light with long afterglow characteristic through the ions $Pr^{3+}$; and brightness of the emitted red light with the long afterglow characteristic will be enhanced after the luminescent material is subjected to external temperature and mechanical stimulation. The ions $Er^{3+}$ will emit green light under the near-infrared irradiation so as to realize the upconversion luminescence characteristic. The ions $Pr^{3+}$ and $Er^{3+}$ have the photoluminescence characteristic under the ultraviolet irradiation, and multi-color variable luminescent can be realized by adjusting the irradiation wavelength. On the other hand, the inorganic main material $M_{1-x-y-z}NbO_3$ serving as a host has stable physicochemical properties and excellent environmental (including light, temperature and mechanical) tolerance, and the microscopic atomic structure of the inorganic main material $M_{1-x-y-z}NbO_3$ can interact with lanthanide atoms to generate a complex light emission mode, so as to realize multidimensional identifiable luminescence.

Emission light of the luminescent material exhibits two kinds of lifetimes, i.e., fluorescence and long-lasting luminescence. The fluorescence disappears immediately once excitation is stopped, while the long-lasting luminescence will be lasting for a period of time after the excitation is stopped. The luminescence of the two kinds of lifetimes can be identified by naked eyes.

The long-lasing luminescence of the luminescent material is capable of being repeatedly excited by irradiation of light having a wavelength of 300 nm to 500 nm. The wavelength range indicates that the luminescent material can not only be excited by ultraviolet light (e.g., 365 nm), but also be excited by blue light (400 nm to 450 nm).

The luminescent material has the long-lasting luminescence characteristic at room temperature (20° C. to 25° C.). The long-lasting luminescence can disappear by cooling, and when the temperature rises, the long-lasting emission reappears until it disappears again. Specifically, at room temperature (20° C. to 25° C.), the luminescent material has the long-lasting luminescence characteristic that can be identified by naked eyes. When the temperature is cooled to 0° C., the intensity of the long-lasting luminescence is low since the energy is insufficient to maintain transition of a large amount of electrons, so that the long-lasting luminescence cannot be identified by naked eyes. However, when the energy can satisfy the transition of a large amount of electrons after the temperature rises, the intensity of the long-lasting luminescence is increased, and the long-lasting luminescence can be identified by naked eyes again. When the temperature exceeds 200° C., almost all of electrons in the traps are released, and the long-lasting luminescence disappears.

After the luminescent material is irradiated by light having a wavelength of 300 nm to 500 nm, the luminescent material can emit mechanoluminescence under the mechanical stimulation. Within limit of elastic deformation of the luminescent material, an intensity of the mechanoluminescence is directly proportional to an intensity of applied stress. Moreover, the mechanoluminescence has light irradiation reproducibility, that is, the mechanoluminescence reappears after light irradiation and decays over time.

The emission light of the luminescent material is color-tunable luminescence among red, orange, yellow, yellow green and green. Specifically, under temperature stimulation and mechanical stimulation, due to the contribution of ions $Pr^{3+}$, the luminescence is red and has a wavelength of 580 nm to 650 nm; under irradiation of near-infrared light having a wavelength of 980 nm, due to the contribution of ions $Er^{3+}$, the luminescence is green and has a wavelength of 520 nm to 570 nm; and, under irradiation of ultraviolet light having a wavelength of 360 nm to 379 nm, due to the combined action of ions $Pr^{3+}$ and $Er^{3+}$, the ultraviolet light having a shorter wavelength more effectively excites the ions $Pr^{3+}$ to emit light, and the ultraviolet light having a longer wavelength more effectively excites the ions $Er^{3+}$ to emit light. Therefore, luminescence color has different emission ratios of green light (having a peak of 530 nm and a peak of 550 nm, within a range of 520 nm to 570 nm) to red light (having a center of 612 nm, within a range of 580 nm to 650 nm) within the wavelength range of 520 nm to 650 nm according to the selectivity of the irradiation wavelength, so that a continuously tunable color in red-orange-yellow-yellow green-green is obtained.

As a preferred implementation, $0.003 \leq x \leq 0.03$, $0.003 \leq y \leq 0.08$, and $-0.05 \leq z \leq 0.03$. The luminescent material within this range has multidimensional luminescence intensity that can be clearly identified by naked eyes.

Further, in this embodiment of the present application, it is verified by tests that the multidimensional luminescence performances of the luminescent material are relatively balanced when x=0.003, y=0.003 and z=0. That is, most preferably, the chemical formula of the luminescent material is $M_{0.94}NbO_3$:0.003Pr,0.003Er.

In another aspect, an embodiment of the present application provided a preparation method for the above mentioned luminescent material, which uses a solid phase synthesis method in an air environment and comprises the following steps:

a) separately weighing an alkali metal raw material, an Nb raw material, a Pr raw material and an Er raw material in a stoichiometric ratio of elements, adding deionized water or absolute ethyl alcohol, fully grinding and drying to obtain mixed powder;

b) pre-sintering the mixed powder in the air, and cooling to obtain a cooled product;

c) grinding and uniformly mixing the cooled product, and calcining the cooled product in the air to obtain a calcined product; and d) cooling the calcined product and grinding into powder to obtain the luminescent material.

As a preferred implementation, the alkaline metal raw material comprises one of or a combination of two or more of carbonates, oxides, sulfides, halides and peroxides of alkaline metal elements, where the alkaline metal element specifically refers to any one of or a combination of two or more of Li, Na and K; the Nb raw material comprises one or two of oxides and chlorides of Nb; the Pr raw material comprises one of or a combination of two or more of oxides, nitrates and carbonates of Pr; and, the Er raw material comprises one of or a combination of two or more of oxides, nitrates and carbonates of Er.

As a preferred implementation, in the step b), a temperature for the pre-sintering is 700° C. to 950° C., and a time for the pre-sintering is 3 to 6 hours. The temperature and the time for the pre-sintering can be rationally selected from the ranges. For example, the temperature for the pre-sintering may also be 750° C., 800° C., 850° C., 900° C., etc., and the time for the pre-sintering may also be 3.5 h, 4 h, 4.5 h, 5 h, 5.5 h, etc.

As a preferred implementation, in the step c), a temperature for the calcining is 950° C. to 1400° C., and a time for the calcining is 3 to 8 hours. The temperature and the time for the calcining can be rationally selected from the ranges. For example, the temperature for the calcining may also be 1000° C., 1100° C., 1200° C., 1250° C., 1300° C., 1350° C., etc., and the time for the calcining may also be 4 h, 5 h, 6 h, 7 h, etc.

To more clearly describe the luminescent material provided by the embodiments of the present invention in detail, the following description will be given in conjunction with the specific embodiments and the accompanying drawings.

The samples in embodiments 1 to 8 of the present invention are prepared by the high-temperature solid phase synthesis method described above, and the specific material components, characteristic values and the parameter values in the preparation method are shown in Table 1 below.

TABLE 1

Material components, characteristic values and parameter values in the preparation method of the samples in Embodiments 1 to 8

| Embodiment | Material component | Values of x, y and z | Raw material (g) | Pre-sintering temperature Pre-sintering time | Calcining temperature Calcining time |
|---|---|---|---|---|---|
| 1 | $Na_{0.994}NbO_3:0.003Pr, 0.003Er$ | x = 0.003<br>y = 0.003<br>z = 0 | $Na_2CO_3$ = 10.5365<br>$Nb_2O_5$ = 26.5837<br>$Pr_6O_{11}$ = 0.1022<br>$Er_2O_3$ = 0.1148 | 900° C.<br>4 h | 1300° C.<br>7 h |
| 2 | $Li_{0.985}NbO_3:0.006Pr, 0.009Er$ | x = 0.006<br>y = 0.009<br>z = 0 | $Li_2CO_3$ = 7.279<br>$NbCl_5$ = 54.0394<br>$PrH_{12}N_3O_{15}$ = 0.5221<br>$Er_2O_3$ = 0.3443 | 950° C.<br>3 h | 1400° C.<br>5 h |
| 3 | $K_{0.978}NbO_3:0.001Pr, 0.001Er$ | x = 0.001<br>y = 0.001<br>z = 0.02 | $K_2CO_3$ = 13.7947<br>$Nb_2O_5$ = 26.5837<br>$Pr_2H_{16}C_3O_{17}$ = 0.0606<br>$ErH_{12}N_3O_{15}$ = 0.0923 | 700° C.<br>6 h | 1250° C.<br>6 h |
| 4 | $Na_{0.71}K_{0.2}NbO_3:0.01Pr, 0.06Er$ | x = 0.01<br>y = 0.06<br>z = 0.02 | NaCl = 8.2993<br>KCl = 2.9823<br>$Nb_2O_5$ = 26.5837<br>$Pr_6O_{11}$ = 0.3405<br>$Er_2(CO_3)_3$ = 3.0876 | 800° C.<br>5 h | 1200° C.<br>4 h |
| 5 | $Na_{0.5}Li_{0.4}NbO_3:0.05Pr, 0.1Er$ | x = 0.05<br>y = 0.1<br>z = −0.05 | $Na_2O_2$ = 3.8994<br>LiCl = 3.3915<br>$NbCl_5$ = 54.0394<br>$Pr_6O_{11}$ = 1.7026<br>$Er_2O_3$ = 3.8256 | 750° C.<br>5 h | 1100° C.<br>3 h |
| 6 | $Li_{0.45}K_{0.5}NbO_3:0.01Pr, 0.05Er$ | x = 0.01<br>y = 0.05<br>z = −0.01 | $Li_2O$ = 1.3459<br>$K_2CO_3$ = 6.9112<br>$Nb_2O_5$ = 26.5837<br>$Pr_6O_{11}$ = 0.3405<br>$Er_2O_3$ = 1.9128 | 850° C.<br>3.5 h | 1050° C.<br>5 h |
| 7 | $Li_{0.2}Na_{0.54}K_{0.1}NbO_3:0.03Pr, 0.08Er$ | x = 0.03<br>y = 0.08<br>z = 0.05 | $Na_2S$ = 4.2146<br>$Li_2CO_3$ = 1.4779<br>$K_2CO_3$ = 1.3822<br>$Nb_2O_5$ = 26.5837<br>$Pr_6O_{11}$ = 1.0215<br>$Er_2O_3$ = 3.0605 | 700° C.<br>4 h | 950° C.<br>5 h |
| 8 | $Li_{0.41}Na_{0.3}K_{0.2}NbO_3:0.02Pr, 0.04Er$ | x = 0.02<br>y = 0.04<br>z = 0.03 | $Na_2CO_3$ = 3.1800<br>$Li_2CO_3$ = 3.0298<br>$K_2CO_3$ = 2.7645<br>$Nb_2O_5$ = 26.5837<br>$Pr_6O_{11}$ = 0.6810<br>$Er_2O_3$ = 1.5302 | 900° C.<br>3 h | 1100° C.<br>3 h |

The colors of the long-lasing luminescence, mechanoluminescence (including compression luminescence and frictional luminescence), upconversion luminescence and photoluminescence of the luminescent materials prepared in Embodiments 1 to 8 of the present application are shown in Table 2 below.

C.). The long-lasting luminescence intensity will become weak by cooling (e.g., to 0° C.) and thus cannot be identified by naked eyes. When the temperature rises, the long-lasting luminescence intensity will be increased and can be identified again by naked eyes. After the temperature rises to 200° C., the long-lasing luminescence will disappear completely.

TABLE 2

Multidimensional luminescence characteristic table of the samples in Embodiments 1 to 8

| Embodiment | Long-lasting luminescence | Mechanoluminescence | | Upconversion luminescence $\lambda_{ex}$ = 980 nm | Photoluminescence | | | | |
|---|---|---|---|---|---|---|---|---|---|
| | | Compression luminescence | Frictional luminescence | | $\lambda_{ex}$ = 373 nm | $\lambda_{ex}$ = 374 nm | $\lambda_{ex}$ = 375 nm | $\lambda_{ex}$ = 376 nm | $\lambda_{ex}$ = 377 nm |
| 1 | Red | Red | Red | Green | Red | Orange | Yellow | Yellow green | Green |
| 2 | Red | Red | Red | Green | Red | Orange | Yellow | Yellow green | Green |
| 3 | Red | Red | Red | Green | Red | Orange | Yellow | Yellow green | Green |
| 4 | Red | Red | Red | Green | Red | Orange | Yellow | Yellow green | Green |
| 5 | Red | Red | Red | Green | Red | Orange | Yellow | Yellow green | Green |
| 6 | Red | Red | Red | Green | Red | Orange | Yellow | Yellow green | Green |
| 7 | Red | Red | Red | Green | Red | Orange | Yellow | Yellow green | Green |
| 8 | Red | Red | Red | Green | Red | Orange | Yellow | Yellow green | Green |

Figure 13:
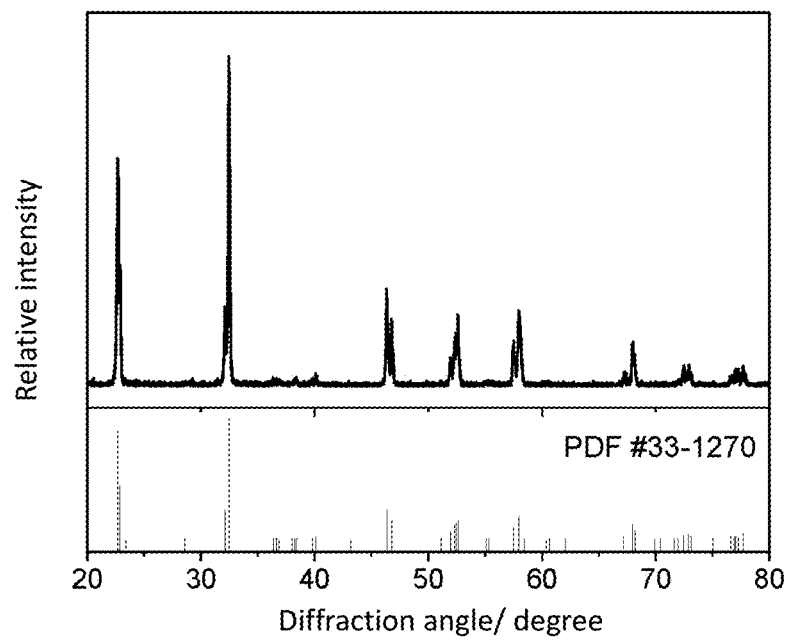
FIG. 13 is an X-ray powder diffraction pattern of the sample in Embodiment 1.
Figure 14:
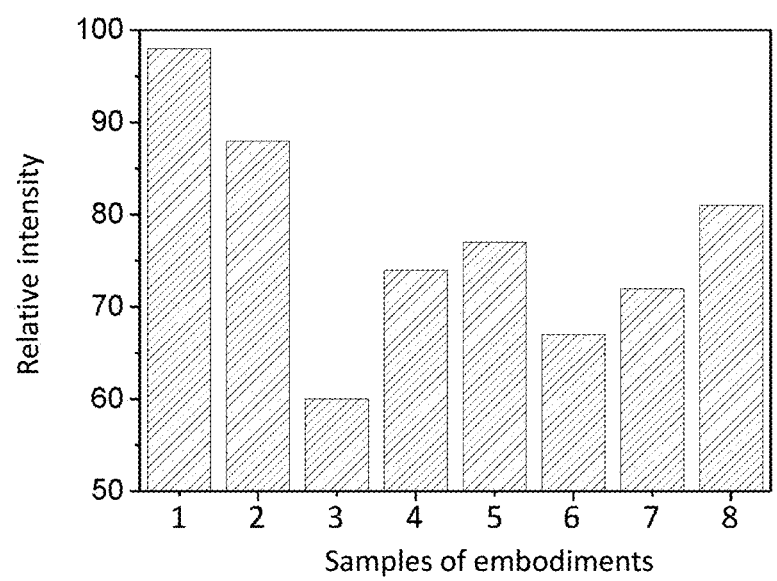
FIG. 14 shows the relative mechanoluminescence intensity of the samples in Embodiments 1 to 8 under compression.

The samples prepared in the embodiments 1 to 8 are white in appearance, and the results of the X-ray powder diffraction test show that the diffraction peaks of the materials have no impurity phase and the materials are all pure-phase materials. FIG. 13 is the X-ray powder diffraction pattern of the sample in Embodiment 1, where the diffraction peak data is consistent with the $NaNbO_3$ powder diffraction standard card (PDF 33#1270). The luminescence performance characterization indicates the samples in Embodiments 1 to 8 all have similar dual-lifetime colorful luminescence performances respond to temperature-force-light multi-stimulation. Due to different components, luminescence intensities of the samples are different. For example, FIG. 14 shows the relative mechanoluminescence intensities of the samples in Embodiments 1 to 8 under compression, where the luminescence intensity of the sample in Embodiment 1 is highest. The following description will be given with reference to the accompanying drawings by taking the sample in Embodiment 1 as an example.

FIG. 1 is an excitation spectrum of emission light having a wavelength of 612 nm in the long-lasting luminescence of the sample in Embodiment 1. It is indicated that the long-lasting luminescence can be repeatedly excited by the irradiation of light having a wavelength of 300 nm to 500 nm.

Figure 2:
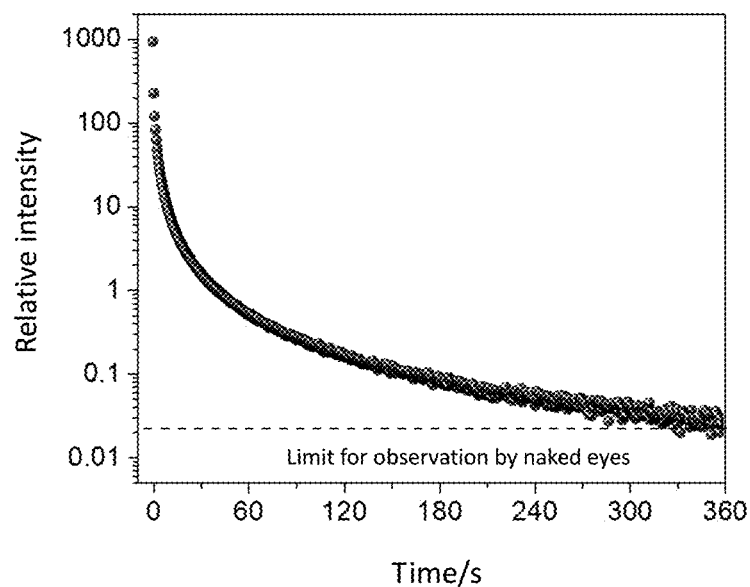
FIG. 2 is a decay curve of long-lasting luminescence of the sample in Embodiment 1.

FIG. 2 is a decay curve of the long-lasting luminescence of the sample in Embodiment 1. The sample emits red light after being irradiated for 1 min by an ultraviolet lamp (365 nm, 6 W), and the red light can be observed for more than 5 min by naked eyes.

Figure 3:
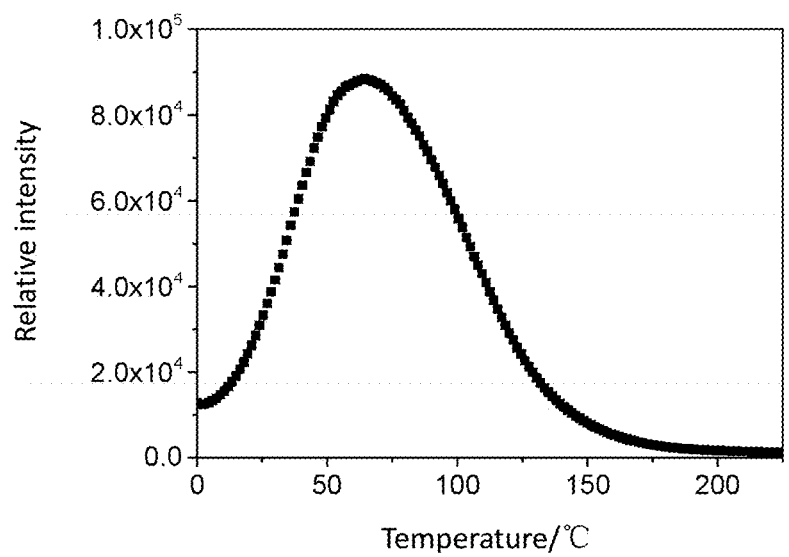
FIG. 3 is a thermoluminescence curve of the sample in Embodiment 1.

FIG. 3 is a thermoluminescence curve of the sample in Embodiment 1. The thermoluminescence peak of the sample is located between 0° C. and 200° C., and the sample shows high thermoluminescence intensity within an interval of 25° C. and 125° C. This characteristic enables the sample to have the long-lasting luminescence characteristic that can be identified by naked eyes at room temperature (20° C. to 25°

Figure 4:
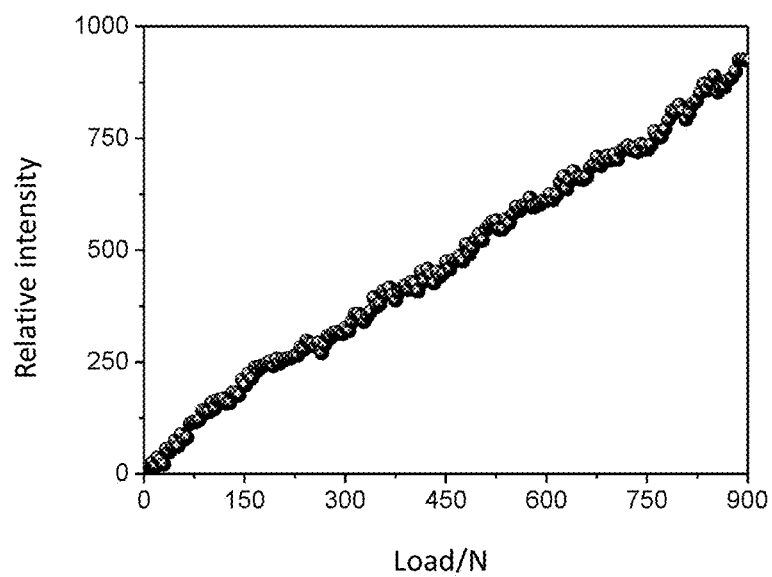
FIG. 4 is a mechanoluminescence curve of a composite sample prepared from the sample in Embodiment 1 and epoxy resin.

FIG. 4 is a mechanoluminescence curve of a composite sample prepared from the sample in Embodiment 1 and epoxy resin. It can be seen from FIG. 4 that there is a linear dependency relationship between the mechanoluminescence intensity and the load.

Figure 5:
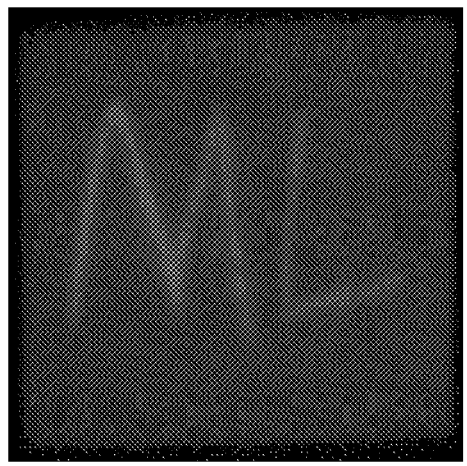
FIG. 5 is a mechanoluminescence picture of a composite sample prepared from the sample in Embodiment 1 and thermoplastic polyurethane elastomer rubber under friction of pen writing.

FIG. 5 is a mechanoluminescence picture of a composite sample prepared from the sample in Embodiment 1 and thermoplastic polyurethane elastomer rubber under friction of pen writing. The handwriting of the word "ML" can be clearly observed from the mechanoluminescence.

Figure 6:
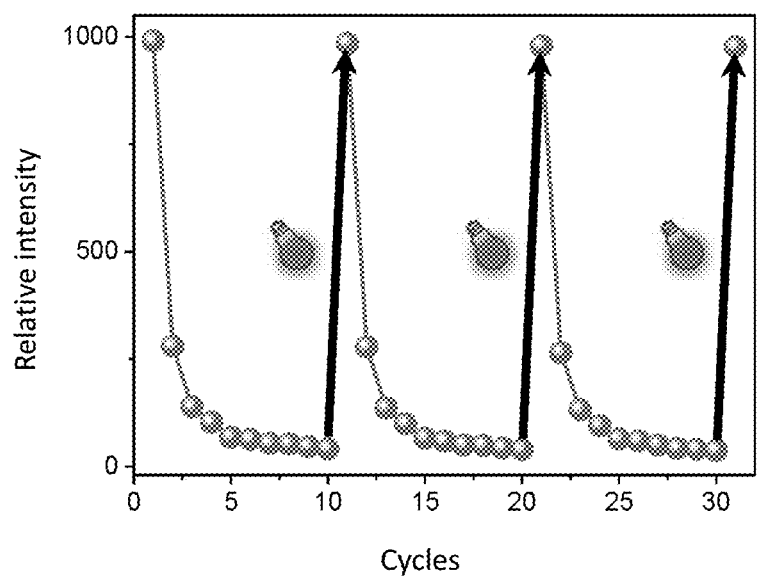
FIG. 6 is a curve showing decay and recoverability of the mechanoluminescence of the composite sample prepared from the sample in Embodiment 1 and epoxy resin.

FIG. 6 is a curve showing decay and recoverability of the mechanoluminescence of the composite sample prepared from the sample in Embodiment 1 and epoxy resin. The mechanoluminescence intensity decreases as the times of stress applications increase. This is because the energy captured by the trap is emptied gradually. The trap can be recharged by the effective excitation of light irradiation, so as to realize the recoverability of the mechanoluminescence characteristic, which is similar to the recoverability of the long-lasting luminescence.

Figure 7:
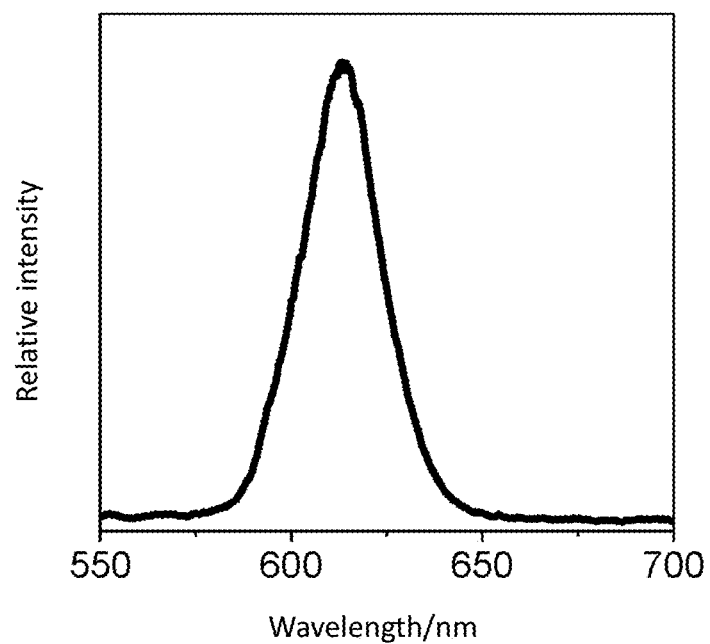
FIG. 7 is a long-lasting luminescence spectrum of the sample in Embodiment 1.

FIG. 7 is a long-lasting luminescence spectrum of the sample in Embodiment 1, which is derived from $^1D_2$-$^3H_4$ transition of ions $Pr^{3+}$ and has an emission peak center of 612 nm and an emission peak range of 580 nm to 650 nm.

Figure 8:
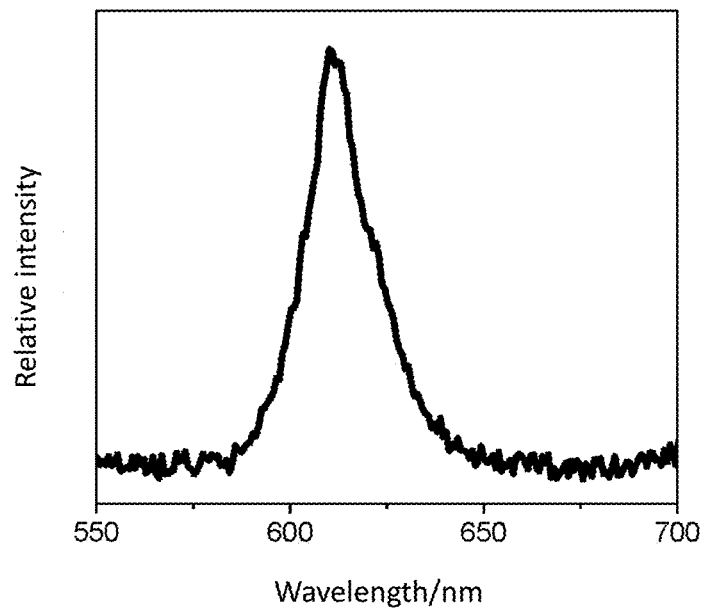
FIG. 8 is a mechanoluminescence spectrum of the sample in Embodiment 1.

FIG. 8 is a mechanoluminescence spectrum of the sample in Embodiment 1, which is the same as the long-lasting luminescence spectrum, where the emission peak center is 612 nm, and the emission peak range is 580 nm to 650 nm. It is indicated that the mechanoluminescence is also derived from the $^1D_2$-$^3H_4$ transition of ions $Pr^{3+}$.

Figure 9:
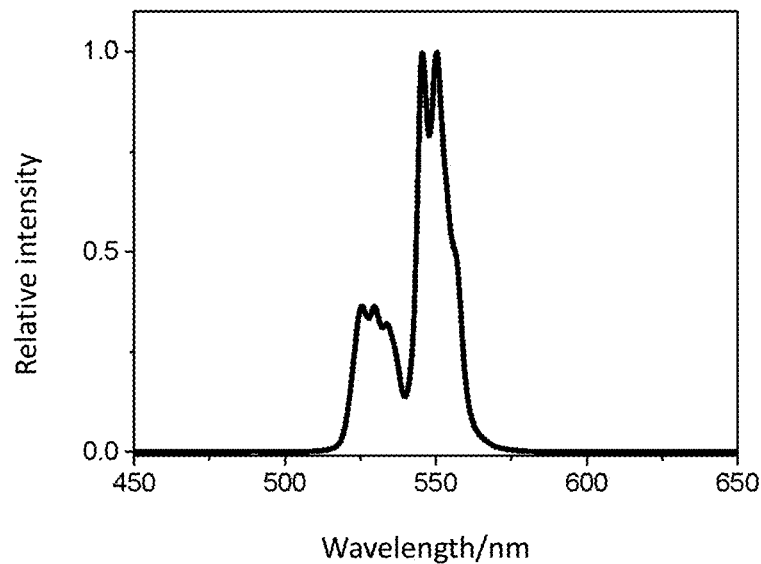
FIG. 9 is an upconversion luminescence spectrum of the sample in Embodiment 1.

FIG. 9 is an upconversion luminescence spectrum of the sample in Embodiment 1 under irradiation of near-infrared light at 980 nm. The spectrum (within a range of 520 nm to 570 nm) consists of transitions of $^2H_{11/2}$-$^4I_{15/2}$ (having a center of 530 nm) and $^4S_{3/2}$-$^4I_{15/2}$ (having a center of 550 nm) of ions $Er^{3+}$, and the luminescence color is green.

Figure 10:
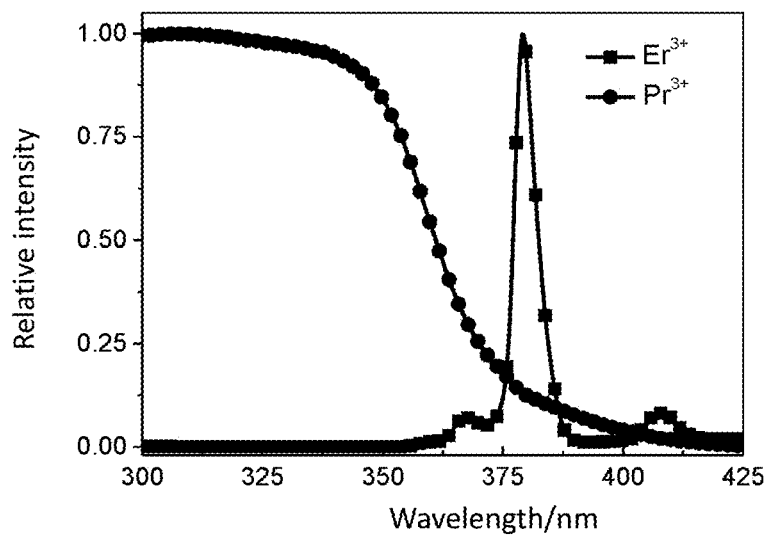
FIG. 10 is excitation spectra of characteristic emission of $Pr^{3+}$ and $Er^{3+}$ ions of the sample in Embodiment 1.

FIG. 10 is excitation spectra of characteristic emission of $Pr^{3+}$ and $Er^{3+}$ ions of the sample in Embodiment 1. Under the irradiation of the ultraviolet light having a wavelength of 360 nm to 379 nm, the ions $Pr^{3+}$ and $Er^{3+}$ are excited simultaneously. The ultraviolet light having a shorter wavelength more effectively excites the ions $Pr^{3+}$ to emit light, and the ultraviolet light having a longer wavelength more effectively excites the ions $Er^{'}$ to emit light, so that selective excitation of the luminescence intensity of ions $Pr^{3+}$ and $Er^{3+}$ can be realized by regulating the excitation wavelength.

Figure 11:
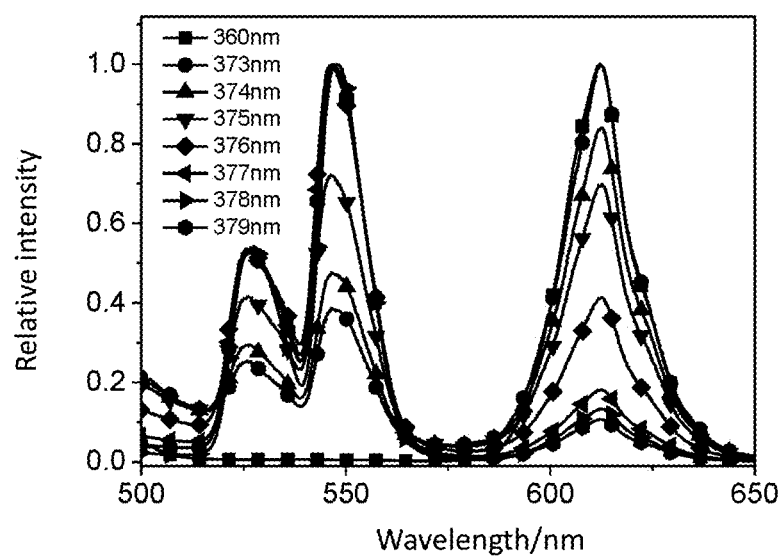
FIG. 11 is photoluminescence spectra of the sample in Embodiment 1 under the excitation of ultraviolet light having different wavelengths.

FIG. 11 is photoluminescence spectra of the sample in Embodiment 1 under the excitation of ultraviolet light having different wavelengths (360 nm, 373 nm, 374 nm, 375 nm, 376 nm, 377 nm, 378 nm and 379 nm). The emission spectra comprises two parts, i.e., green light emission (with a peak of 530 nm and a peak of 550 nm, and within a range of 520 nm to 570 nm) of ions $Er^{3+}$ and red light emission (with a center of 612 nm, and within a range of 580 nm to 650 nm) of ions $Pr^{3+}$.

Figure 12:
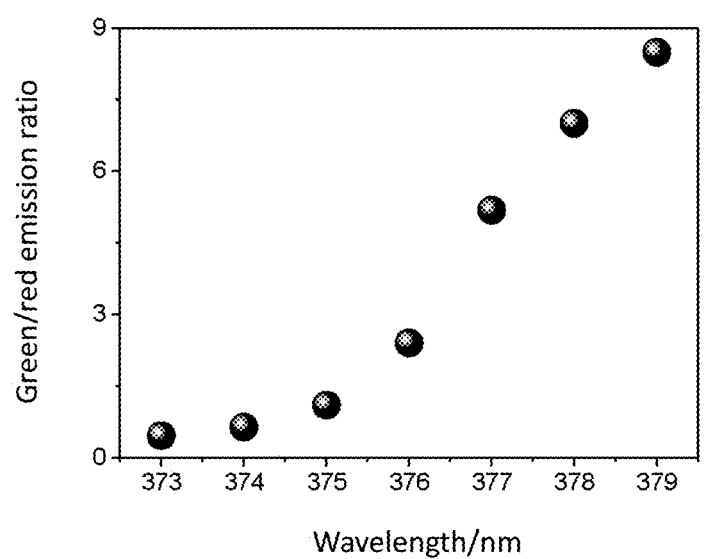
FIG. 12 shows change of the ratio of green light to red light of the sample in Embodiment 1 as a function of the excitation wavelength of ultraviolet light.

FIG. 12 shows change of the ratio of green light to red light of the sample in Embodiment 1 as a function of the excitation wavelength of ultraviolet light. The green/red ratio is 0.46 at 373 nm, 0.64 at 374 nm, 1.1 at 375 nm, 2.4 at 376 nm, 5.18 at 377 nm, 7 at 378 nm and 8.49 at 379 nm, respectively. It is indicated that the continuous regulation of the green light/red light ratio can be realized by finely regulating the excitation wavelength, so that a continuously tunable color from red (having an excitation wavelength of 373 nm) to orange (having an excitation wavelength of 374 nm), yellow (having an excitation wavelength of 375 nm), yellow green (having an excitation wavelength of 376 nm) and green (having an excitation wavelength of 377 nm to 379 nm) is realized.

The foregoing description merely shows the illustrative embodiments of the present application and is not intended to limit the present application in any form and in essence. It is to be pointed out that various improvements and supplements made by a person of ordinary skill in the art without departing from the method of the present application shall fall into the protection scope of the present application. Equivalent variations of some alterations, modifications and evolutions made to the disclosed technical content by those skilled in the art without departing from the spirit and scope of the present application are equivalent embodiments of the present application. Meanwhile, all alterations, modifications and evolutions made to the foregoing embodiments in accordance with the essential techniques of the present application shall still fall into the scope of the technical solutions of the present application.

What is claimed is:

1. A luminescent material having a chemical formula of $M_{1-x-y-z}NbO_3:xPr,yEr$, where M is one or two of alkali metal elements Li and Na, and $0.001 \leq x \leq 0.05$, $0.001 \leq y \leq 0.1$ and $-0.05 \leq z \leq 0.05$, wherein:

emission lights of the luminescent material exhibit two kinds of lifetimes: fluorescence and long-lasting luminescence; the fluorescence disappears immediately once excitation is stopped, while the long-lasting luminescence will be lasting after the excitation is stopped;

the luminescent material has long-lasting luminescence characteristic at room temperature; the long-lasting luminescence disappears by cooling, and reappears when the temperature rises again;

the luminescent material is capable of emitting mechanoluminescence under mechanical stimulation, and an intensity of the mechanoluminescence is directly proportional to an intensity of applied stress;

emission light of the luminescent material is color-tunable luminescence among red, orange, yellow, yellow green and green; under temperature stimulation and mechanical stimulation, the luminescence is red and has a wavelength of 580 nm to 650 nm; under irradiation of near-infrared light having a wavelength of 980 nm, the luminescence is green and has a wavelength of 520 nm to 570 nm; under irradiation of ultraviolet light having a wavelength of 360 nm to 379 nm, the luminescence has a continuously tunable color in red-orange-yellow-yellow green-green according to selectivity of irradiation wavelength; and a tunable wavelength of the luminescence ranges from 520 nm to 650 nm.

2. The luminescent material of claim 1, wherein, $0.003 \leq x \leq 0.03$, $0.003 \leq y \leq 0.08$, and $-0.05 \leq z \leq 0.03$.

3. The luminescent material of claim 1, wherein, the long-lasing luminescence of the luminescent material is capable of being repeatedly excited by irradiation of light having a wavelength of 300 nm to 500 nm.

4. A preparation method for the luminescent material of claim 1, wherein, the luminescent material is prepared by a solid phase synthesis method in an air environment and the preparation method comprises the following steps:

a) separately weighing an alkali metal raw material, an Nb raw material, a Pr raw material and an Er raw material in a stoichiometric ratio of elements, adding deionized water or absolute ethyl alcohol, fully grinding and drying to obtain mixed powder;

b) pre-sintering the mixed powder in the air, and cooling to obtain a cooled product;

c) grinding and uniformly mixing the cooled product, and calcining the cooled product in the air to obtain a calcined product; and d) cooling the calcined product and grinding into powder to obtain the luminescent material.

5. The preparation method of claim 4, wherein, the alkaline metal raw material comprises one of or a combination of two or more of carbonates, oxides, sulfides, halides and peroxides of alkaline metal elements; the Nb raw material comprises one or two of oxides and chlorides of Nb; the Pr raw material comprises one of or a combination of two or more of oxides, nitrates and carbonates of Pr; and, the Er raw material comprises one of or a combination of two or more of oxides, nitrates and carbonates of Er.

6. The preparation method of claim 4, wherein, in the step b), a temperature for the pre-sintering is 700° C. to 950° C., and a time for the pre-sintering is 3 to 6 hours.

7. The preparation method of claim 4, wherein, in the step c), a temperature for the calcining is 950° C. to 1400° C., and a time for the calcining is 3 to 8 hours.

* * * * *